United States Patent Office 3,218,278
Patented Nov. 16, 1965

3,218,278
PROCESS FOR DISPERSING POLYMERS
Arthur J. Leydon, Waltham, George A. Lothrop, Concord, Robert F. Stierli, Lexington, and Donald M. Wacome, Peabody, Mass., assignors to W. R. Grace & Co., Cambridge, Mass., a corporation of Connecticut
No Drawing. Filed Feb. 24, 1959, Ser. No. 794,834
24 Claims. (Cl. 260—27)

This invention relates to dispersions of polymers in organic liquids which are non-solvents for the polymers. It relates particularly to dispersions of vinyl polymers such as the butadiene-styrene copolymers, the butadiene-acrylonitrile copolymers, neoprenes, and polyacrylates which in the solid state are either rubbery or hard and horny depending on the chemical nature of the polymer. Such polymers have found wide use in adhesives, container sealing compounds, calking compounds, fabric and metal coatings and in many other coating applications.

Coating compositions for the above applications have usually been based on solutions of the polymers in suitable organic solvents. Latices may be used in certain specific applications where there is no danger of water damage, but solutions have ordinarily been preferred because of their greater speed of drying and their greater stability, and because of the superior water-resistance of the deposited films.

Of particular importance to the coating industry in recent years is the development of new polymers with widely varied properties to meet specific application and performance requirements. The properties are varied by changing the chemical nature of the monomers, by varying the monomers or the ratio of monomers used in the production of copolymers, and by changes in polymerization conditions. Recent developments in graft polymerization have made available an even wider variety of polymers. Many of the new polymers have highly desirable qualities, such as excellent oil-resistance, film-consolidation and toughness. The very properties which make them particularly attractive to the coating industry, however, tend to make them less soluble in the commonly used organic solvents and their potential value to the industry has therefore not been realized. Many of the polymers used in coating applications are soluble only in ketones or in aromatic or chlorinated solvents, which are generally undesirable for industrial use because of their high cost, toxicity or unpleasant odor.

A further difficulty in the use of coating solutions is their high viscosity at relatively low solids concentrations. This characteristic, which is common to most of the polymers used in the coating industry, has resulted in the widespread use of dispersions of polymers in organic liquids which are not solvents for the polymers and a number of successful techniques have been developed for preparing such dispersions. Such techniques, however, involve extensive working in a ball mill or other heavy grinding or milling equipment and therefore require considerable outlay in time, power and heavy machinery.

Many of the polymers which have the most desirable properties from the point of view of their end use are manufactured by emulsion polymerization and are available as water dispersions, or latices. There has been for some time a very considerable interest in the possibility of converting these latices directly to solutions or dispersions of polymers in organic liquids, in order to eliminate the cost of coagulating and drying the latices and the difficulty of handling the tough, cohesive coagula which are characteristic of so many of these polymers.

Our invention has for its object the development of a new process for making dispersions of polymers in organic liquids which are non-solvents for the polymers. Additionally, it is our object to develop a process for dispersing polymers which are exceptionally tough and cohesive in their solid condition, and which have heretofore been particularly difficult to disperse in organic liquids. A further object is the development of a process for making dispersions which does not require the heavy, expensive, high-powered equipment often required for this purpose. A still further object of our invention is the development of a process for making dispersions of polymers in organic liquids using latices of the polymers as starting materials. An additional object is the production of compositions based on dispersions of polymers in the highly desirable, inexpensive, non-toxic aliphatic straight-chain liquids such as pentane, hexane, heptane and octane.

We have discovered that the normally tough cohesive coagulum which is characteristic of certain polymers, may be modified by pretreatment of the polymer in its water-dispersed state. More specifically we have discovered that by pretreating the polymer with a material which produces controlled swelling of the polymer particles while they are still in aqueous suspension, we are able to precipitate a new type of coagulum characterized by greatly reduced forces of cohesion within the solid mass of polymer. The forces between the polymer particles in our new type of coagulum are so low, in fact, that the coagulum may be redispersed, i.e., the particles may be brought into a dispersed condition simply by stirring into the coagulum an organic liquid which is a non-solvent for the polymer. While the polymer particles in the coagulum and in the resulting dispersion are somewhat larger than those present in the original latex, the size of the particles is still sufficiently small so that a stable dispersion in the organic liquid is formed. We believe that the great majority of particles in the redispersible coagula and in the dispersions made according to our invention are of microscopic size, i.e. between 0.2 and 30 microns in diameter.

We have discovered, furthermore, that the pretreatment of the polymer in aqueous dispersion must be very carefully controlled in order to obtain the desired properties in the coagulum. Too rigorous pretreatment, i.e. too much swelling, makes it impossible to separate the coagulum from the aqueous phase of the latex. Insufficient swelling, on the other hand, allows the development of normal cohesive forces between particles, and makes it impossible to redisperse the polymer particles by simple stirring.

Finally, we have discovered that the pretreatment necessary in order to produce the new coagulum of our invention varies greatly from polymer to polymer. Apparently, the strength of the cohesive forces developed during coagulation is a great deal stronger in certain types of polymers than in others. Such polymers require more intensive pretreatment in order to reduce the cohesive forces in the coagulum to the desired extent, i.e. in order to produce a redispersible coagulum. We have developed special techniques for pretreating latices of these more difficult-to-disperse polymers so that our new type of coagulum may be precipitated from them.

According to our invention, the particles of polymer are treated while still in aqueous suspension with a material which produces controlled swelling in the polymer particles. The swelling agent which is added to the latex is an organic liquid which can be absorbed by the polymer, and which consequently causes the polymer particles to swell. Ordinarily, the swelling liquid is a non-solvent for the polymer. In certain cases, however, as will be set forth in more detail in the following disclosure, a liquid which is a solvent for the polymer may be used as the swelling agent. A coagulant is then added to the latex in order to precipitate a soft solid coagulum having greatly reduced forces of cohesion between the particles. The aqueous portion of the latex may be separated from the coagulum by any desired mechanical means, after which a dispersion of polymer particles may be produced by stirring into the coagulum an organic liquid which is a non-solvent for the polymer.

Our invention will be more fully understood by reference to the following examples.

EXAMPLE I

To 100 grams of a 38.6% solids latex of the hexane-insoluble 50–50 butadiene-styrene rubber known in the trade as "SBR rubber 1014" there was added 38.6 grams of hexane and the mixture was stirred for about 10 minutes. 100 grams of ethyl alcohol was then added to the latex-hexane mixture and stirring was continued until coagulation was complete. A soft solid coagulum was precipitated, leaving a perfectly clear aqueous phase containing most of the alcohol dissolved therein. No hexane could be separated from the aqueous phase after coagulation, indicating complete absorption of the hexane into the rubber. The coagulum was separated from the aqueous phase by centrifuging, after which a further quantity of 100 grams of hexane was added to the coagulum and stirred in. A stable, low viscosity dispersion of butadiene-styrene rubber particles in hexane resulted.

The soft solid coagulum of Example I can best be characterized as a plastic mass, lacking the tough, elastic quality of the ordinary rubber coagulum. The material has enough cohesiveness so that it can be picked up and handled, and it is rather surprisingly completely free of tackiness. While the coagulum has a definite odor of hexane, no hexane can be wiped off the outside, nor can it be squeezed out of the coagulum. It would appear as though the rubber were the continuous phase of the coagulum, with the hexane absorbed within the mass. Hexane will gradually evaporate from the coagulum if it is allowed to stand in the air, and as evaporation proceeds, the coagulum toughens until finally it approaches the characteristics of a normal rubber coagulum.

The characteristic by which the coagulum of Example I can most readily be differentiated from the usual butadiene-styrene rubber coagulum, however, is its quality of redispersibility. The cohesive bonds within the coagulum, while developed to the point at which the particles are bound together in a solid structure, are so weak that they may be broken by the simple operation of stirring an organic non-solvent liquid into the coagulum.

The particles of rubber in the resulting dispersion are considerably larger than those of the original latex. Some of this enlargement is due to swelling by absorption of the hexane, some is due to agglomeration of particles into larger entities. Examination of the particles in the hexane-treated latex showed that the diameter of the particles, originally averaging 0.1 micron, had increased in diameter by at least 20%. Some clumping of the particles was also observed. The rubber particles in the finished dispersion, on the other hand, were found to range between 0.2 and 30 microns in diameter. We believe that a large proportion of this increase in size is due to the agglomeration of particles which takes place in the initial stages of coagulation, and which is not overcome by stirring the organic non-solvent liquid into the coagulum.

The coagulum of Example I was found to contain only about 5% of water carried down with it from the aqueous phase. This is considerably less than the 30% of water which is present in the usual rubber coagulum, and which ordinarily has to be removed by drying at an elevated temperature before the coagulum is used. The presence of the hexane in the rubber, making the whole rubber mass more hydrophobic, is believed to be responsible for the more efficient separation from the aqueous phase. Analysis of the liquid which was separated from the coagulum showed that most of the soap which had been present in the latex as a stabilizer had been removed in the aqueous phase.

The dispersion of butadiene-styrene rubber particles in hexane which was produced in the final step of Example I had a total solids of 23.6% and a viscosity of 1100 centipoises at 70° F. when measured on a Brookfield viscometer LVF model using a No. 2 spindle at 60 r.p.m. In contrast, the viscosity of a 12.8% solution of the same rubber in toluene was 1100 centipoises at 70° F. The viscosity and concentration of the dispersion could be varied according to need by varying the amount of hexane stirred into the coagulum.

EXAMPLE II

To 200 grams of a 38.6% solids latex of "1014" butadiene-styrene rubber there was added 40 grams of hexane and the mixture was stirred for about 10 minutes. Coagulation was effected by the addition to the latex of 1.5 grams of a 20% solution of calcium nitrate in water. The rubber was precipitated as a soft solid coagulum containing the added hexane. The aqueous phase was removed by filtration through a wire screen, after which the coagulum was redispersed by stirring in 80 grams of hexane. A stable dispersion of rubber particles was obtained.

EXAMPLE III

The process of Example I was carried out except that octane was substituted for hexane in both the pretreatment and redispersion steps. A good dispersion of butadiene-styrene rubber in the octane was obtained.

EXAMPLE IV

The process of Example I was carried out except that the hexane and the alcohol were added to the latex simultaneously and stirring was continued until coagulation took place. The coagulum was found to contain all the hexane, and was in every way similar to that of Example I. Apparently absorption of the hexane by the rubber particles in aqueous suspension is so rapid that this can be accomplished even while coagulation is taking place.

EXAMPLE V 200 grams of a 40% solids latex of a 50–50 butadiene-styrene rubber sold under the trademark "Darex" polymer 620L was mixed with 60 grams of iso-heptane and the mixture was stirred for about 10 minutes. 100 grams of alcohol was then added, and the soft solid coagulum was separated from the aqueous phase by centrifuging. A stable dispersion of rubber particles in iso-heptane was made by stirring 60 grams of iso-heptane into the coagulum.

A number of other polymers, for example various neoprenes, high styrene butadiene-styrene copolymers and high acrylonitrile butadiene-acrylonitrile copolymers, when treated according to the process of Example I, yielded relatively hard coagula which could not be redispersed simply by stirring with an organic, non-solvent liquid. We have found that, in order to precipitate redispersible coagula from the above polymers, a more intensive pretreatment must be used. A most important part of our invention is the discovery of a number of different methods by which the intensity of the pretreatment may be increased. By using these different methods, either singly or in combination, we have been able to precipitate redispersible coagula from a large number of polymers having widely different characteristics. We have also developed a technique for estimating the strength of pretreatment which must be used with any given polymer in order to precipitate a redispersible coagulum from a latex of the polymer. A clearer understanding of the nature of our pretreatment and its effect on the polymers should be helpful in understanding the methods by which we are able to vary the intensity of the pretreatment.

It has become apparent as a result of the many hundreds of experiments performed in the course of the development of our invention that the essential factor in the production of a redispersible coagulum is the proper degree of preswelling of the polymer particles in aqueous suspension and that the preswelling of the particles depends on the capacity of the polymer to absorb the swelling liquid used in the pretreatment step. We have found that the more swelling liquid which can be absorbed by the polymer particles in aqueous suspension, the smaller are the cohesive forces which are developed between the particles when coagulation takes place. The amount of swelling liquid which can be absorbed by the polymer particles, in other words their absorption capacity for the swelling liquid, can therefore be used as a measure of the ability of the polymer to be precipitated from its aqueous dispersion in the form of a redispersible coagulum.

The mechanism by which the cohesive forces within the coagulum are reduced by preswelling the polymer particles is not clearly understood. We believe, however, that at least two effects are present. We believe that the absorption of organic liquid causes the particles to swell and consequently to become larger in diameter. The larger particles are not able to approach each other as closely or in as closely packed a relationship as would smaller particles, which factor is probably effective in reducing the strength of the attractive forces developed between particles on coagulation. We believe that some of the swelling liquid is also adsorbed on the polymer particles, with the result that a layer of organic liquid remains attached to the outside surface of the polymer particles. Apparently this layer is also effective in preventing the particles from approaching each other and in cutting down the forces of attraction between the polymer particles during coagulation. We believe that these two effects are at least in part responsible for the greatly reduced strength of the cohesive forces within the coagula of our invention. Whatever the explanation for this phenomenon, however, we have found that preswelling of polymer particles in aqueous suspension is essential to the production of a redispersible coagulum.

We have developed a relatively simple test for determining the absorption capacity of a polymer for a given organic liquid which is capable of swelling the polymer. This test, termed the Film Absorption Capacity Test, measures the amount of liquid which can be absorbed by a dried film of the polymer when immersed in the liquid. A definite correlation has been observed between the absorption capacity so measured and the effect of the organic liquid on the polymer particles in aqueous suspension.

Films 0.062 inch thick for use in measuring absorption capacity were laid down from aqueous dispersions of the polymers to be tested and were dried by exposure to the air. The films were cut into strips approximately 0.075 x 4 inches. The strips were weighed and then immersed in the organic liquid for a period of 24 hours. After removal from the organic liquid, the films were quickly wiped dry and reweighed. The percentage weight increase due to absorption of organic liquid by the dried polymer film has been designated the "absorption capacity" of the polymer for the organic liquid.

We have found a relationship between the absorption capacities of various polymers and the ability to precipitate redispersible coagula from their aqueous dispersions. Table I shows the relationship between absorption capacity and redispersibility of the coagulum for a number of polymers we haves tested. The organic liquid used in the tests represented by Table I was hexane. Redispersibility of the coagulum was estimated by following the procedure of Example I, using hexane as the swelling liquid and observing the dispersibility in hexane of the resulting coagulum. Dispersibility of the coagulum has been characterized as "borderline" when dispersion of the coagulum by stirring in non-solvent organic liquid has been just possible. If the coagulum were any harder, i.e. the cohesive forces any stronger, the particles could not be separated into dispersed form by the application of simple stirring. Dispersions made from "borderline" coagula are stable and usable, but have relatively large particles. Dispersions produced from coagula designated as "good" have much smaller particles. In these cases, the preswelling of the polymer has been somewhat greater, resulting in greater reduction of cohesive forces within the coagulum.

In Table I, the hexane absorption capacity of a number of polymers has been related to the redispersibility of coagula which may be precipitated from hexane-pretreated aqueous dispersons of the polymers by the process of Example I. We have also measured the absorption capacity of the polymers for other organic liquids and have found a similar relationship between absorption capacity and redispersibility of the coagula.

Table I

| Polymer | Absorption capacity (in percent organic liquid on weight of polymer) | Redispersibility of coagulum |
|---|---|---|
| 50-50 butadiene-styrene rubber (SBR 1014). | 111 | Good. |
| 50-50 butadiene-styrene rubber ("Darex" polymer 620L). | 69 | Do. |
| 37-63 butadiene-styrene copolymer ("Darex" polymer 630L). | 59 | Borderline. |
| 30-70 butadiene-styrene copolymer ("Darex polymer 3L). | 55 | Do. |
| Butadiene-styrene-acrylonitrile polymer (Mooney viscosity 70 at 212° F.). | 36.5 | Low borderline. |
| 10-90 butadiene-styrene copolymer ("Darex" polymer 632L). | 32.6 | No dispersion. |
| Polychloroprene (Neoprene 950) | 23 | Do. |
| Butadiene-styrene-acrylonitrile polymer (Mooney viscosity 92 at 212° F.). | 22.5 | Do. |
| Polychloroprene (Neoprene 571) | 18 | Do. |
| Butadiene-acrylonitrile rubber ("Hycar" 1562). | 11.4 | Do. |
| Butadiene-acrylonitrile rubber ("Hycar" 1551). | 4.5 | Do. |
| Butadiene-acrylonitrile rubber ("Hycar" 1577). | 1.6 | Do. |

It will be seen by reference to Table I that the polymers having absorption capacities between about 111 and about 35 yielded redispersible coagula, and that redispersibility decreased with decreasing absorption capacity of the polymers, to a point where no dispersion of polymer could be made.

We have found that it is possible to increase the absorption capacity of many polymers for organic liquids to such an extent that redispersible coagula may be precipitated from latices of the polymers. The following examples illustrate a number of ways in which this increase in absorption capacity may be effected.

EXAMPLE VI 215 grams of a 46.5% solids latex of a 15-85 butadiene-styrene copolymer sold under the trademark "Darex" Polymer 43G was mixed with 207 grams of a 38.6% solids latex of "1014" butadiene-styrene rubber. To this mixture, 180 grams of hexane was added and the mixture was stirred for about 10 minutes. Coagulation was effected by adding 180 grams of alcohol, and the soft solid coagulum was separated from the water phase by centrifuging. The coagulum was redispersed by stirring in 75 grams of hexane.

EXAMPLE VII

A 200 gram portion of a polychloroprene latex (Neoprene 950) containing 50% neoprene solids was mixed with 130 grams of a 38.6% solids latex of "1014" butadiene-styrene rubber. 150 grams of hexane was added and the mixture was stirred for about 10 minutes.

The latex mixture was coagulated by the addition of 150 grams of alcohol, and the soft solid coagulum was separated from the aqueous phase by centrifuging. When 200 grams of hexane was stirred into the coagulum, a stable very fine particle size dispersion of mixed rubbers in hexane resulted. The total solids of the finished dispersion was 31.4% and the viscosity was 563 cps. at 70° F. The dispersion was found to be very useful as a coating composition where an oil-proof coating was desired.

EXAMPLE VIII

The procedure of Example VII was followed, except that 44 grams of the "1014" butadiene-styrene latex was mixed with the neoprene latex. 125 grams of hexane was stirred into the latex followed by coagulation with 125 grams of alcohol. The water was separated from the coagulum by squeezing, after which the coagulum was dispersed in 60 grams of hexane.

The dispersion which resulted from Example VIII, while somewhat coarser than that of Example VII, was nevertheless stable and useful for most coating applications. The rubber mixture in the dispersion of Example VIII was 85% neoprene and 15% Buna-S, as compared with the 66⅔% neoprene-33⅓% Buna-S mixture of Example VII. Dried films laid down from the dispersions of these examples had many of the properties of neoprene films and were very useful in applications where it was desired to use a neoprene coating composition.

The absorption capacity of the polychloroprene (Neoprene 950) as shown in Table I is 23 and the coagulum formed after pretreatment of the neoprene latex with hexane according to the method of Example I was not redispersible. The absorption capacity of the hexane-insoluble butadiene-styrene rubber was 111, while the absorption capacity of the mixed rubbers of Example VIII, measured on a test film formed from the mixture of latices was 36.

In Examples VII and VIII a minor amount of a polymer having a relatively high absorption capacity is added to a polymer having a low absorption capacity. The mixture of the two polymers behaves like a single polymer having an increased capacity to absorb the organic liquid, and it is possible to precipitate a redispersible coagulum from a mixture of the latices of the two polymers.

EXAMPLE IX

A 200 gram portion of a 50% polychloroprene latex (Neoprene 750) was mixed with 87.5 grams of a 40% latex of a 50–50 butadiene-styrene rubber ("Darex" polymer 620L), 130 grams of hexane was added and the mixture was stirred for about 10 minutes. The latex mixture was coagulated by the addition of 130 grams of alcohol and the aqueous phase was separated from the soft solid coagulum by decantation. An excellent dispersion of the mixed rubbers was obtained by stirring 70 grams of hexane into the coagulum.

EXAMPLE X

A 200 gram portion of the 50% neoprene latex used in the previous example was mixed with 83 grams of a 24% solids latex of hexane-soluble 70–30 butadiene-styrene rubber known in the trade as "SBRX274 rubber" and the mixture was pretreated with 115 grams of hexane. Coagulation was effected by the addition of 150 grams of alcohol, and the aqueous phase was separated from the soft solid coagulum by centrifuging. A stable, fine particle size dispersion was obtained by stirring 70 grams of hexane into the coagulum.

In the above example, the added polymer is soluble in the swelling liquid. The combination of polymers in this example, however, behaves in the same manner as the combination of less swellable and more swellable polymers in the previous examples. The combined polymers absorb enough hexane so that a redispersible, solid coagulum is precipitated.

EXAMPLE XI 200 grams of a 50% polychloroprene latex (Neoprene 571) was mixed with 44 grams of the 38.6% solids latex of "1014" butadiene-styrene rubber and the mixture was pretreated with 125 grams of hexane. Coagulation was effected by the addition of 125 grams of alcohol and the aqueous phase was removed from the coagulum by decantation. The dispersion which was made by stirring 50 grams of hexane into the coagulum was stable, but of a somewhat larger particle size than that ordinarily considered most useful for coating compositions.

EXAMPLE XII

The latex-hexane mixture of Example XI was heated to 120° F. before the addition of coagulant, after which the procedure of Example XI was followed.

The resulting dispersion was of noticeably finer particle size than that of Example XI. It is apparent from this result that the effect of pretreatment can be considerably increased by the application of heat.

EXAMPLE XIII

A butadiene-styrene-acrylonitrile polymer having a Mooney viscosity of 92 at 212° F. and an absorption capacity of 22.5 and not dispersible in hexane by the procedure of Example I was treated in the following manner. 200 grams of a 50% hexane solution of the resin known in the trade as "ester gum" was added to 192 grams of a 52% latex of the polymer and the mixture was stirred for about 10 minutes. Coagulation was effected by the addition of 400 grams of alcohol and the coagulum was separated from the aqueous phase by centrifuging. A fine particle size, stable dispersion of the polymer in hexane was made by stirring 100 grams of hexane into the coagulum. The viscosity of the finished dispersion was 3,000 cps. at 70° F. and the total solids was 47.8%

The presence of the dissolved resin in compositions based on the dispersion of Example XIII made the compositions particularly desirable for certain types of applications, imparting advantageous rheological properties to the composition as well as desirable characteristics to the dried films deposited therefrom.

Determination of the absorption capacity of the polymer-resin mixture of Example XIII by the usual procedure of measuring absorption of hexane proved to be impossible because the resin was extracted from the film by the hexane. An estimate of the absorption capacity of the mixture was made by the following method. A strip of film laid down from the latex-resin solution mixture was soaked in a 50% solution of the resin in hexane. A weight increase of nearly 80% was observed, due in part to absorption of additional resin and in part to absorption of solvent. The amount of resin taken up was determined by evaporating off the solvent, and the amount of weight increase due to solvent could then be calculated. It was estimated by this method that the hexane absorption capacity of the polymer-resin combination was 35. The results of this test are reproduced in Table II.

*Table II*

Percentage weight increase of strip in 50% resin
  solution _____ 78.7
Weight increase after evaporating solvent _____ 43.7
Weight increase due to absorption of solvent (absorption capacity of polymer-resin combination) ____ 35
Absorption capacity of polymer for hexane _____ 22.5

The large increase in weight after soaking in the resin solution indicates the affinity of the polymer for this type of resin and helps explain the effectiveness of the resin in increasing the absorption capacity of the polymer.

A number of other resins in addition to the ester gum shown in Example XIII may be used in a similar fashion to increase the absorption capacity of a polymer for a given organic liquid. The resin should be soluble in or should be swollen by the organic liquid which is to be used in the pretreating step and should be soluble in or compatible with the polymer. Among the resins which we have found to be useful in this capacity may be listed the methyl ester of partially hydrogenated rosin; hydrogenated rosin ester gum; polymerized rosin; a low molecular weight styrene polymer sold under the trademark "Picco A75"; a polymerized hydrocarbon resin sold under the trademark "Velsicol AD21"; a hydrocarbon resin sold under the trademark "Vanadiset" resin; polymerized terpene; and rosin amine resins. The resin may be added in solution in an organic solvent as shown in the previous example, or it may be added in the form of a dispersion in water, and mixed with the polymer latex.

EXAMPLE XIV 275 grams of a 36% solids latex of a butadiene-styrene-acrylonitrile polymer having a Mooney viscosity of 92 at 212° F. and an absorption capacity of 17.5 was mixed with 30 grams of a 38.6% solids latex of "1014" butadiene-styrene rubber. To this mixture of latices there was added a solution of 65 grams of the methyl ester of partially hydrogenated rosin in a mixture of 70 grams of hexane and 35 grams of toluene. The latex mixture was coagulated by the addition of a mixture of 90 grams of alcohol and 22 grams of a 20% solution of zinc ammonium benzoate. The coagulum was separated from the water and was redispersed by stirring in 160 grams of iso-heptane. A stable, fine particle size dispersion was obtained.

EXAMPLE XV

The process of Example XIV was repeated, except that 65 grams of hydrogenated rosin-ester gum was substituted for the methyl ester of partially hydrogenated rosin, and that coagulation was effected by the addition of 1.8 grams of alum in 20% water solution. An excellent dispersion was obtained.

EXAMPLE XVI 100 grams of a 35% solids latex of a butadiene-styrene-acrylonitrile polymer having a Mooney viscosity of 172 at 212° F. and an absorption capacity of 23.5 was treated with a solvent mixture consisting of 35 grams of xylene and 35 grams of hexane.

Coagulation was effected by adding 100 grams of alcohol, and the aqueous-alcohol phase was squeezed out of the coagulum. Hexane was stirred into the coagulum and a stable, fairly fine particle size dispersion of the polymer in the hexane was obtained.

The polymer used in the above example could not be precipitated in the form of a redispersible coagulum when the latex was pretreated with hexane alone according to the process of Example I. The mixture of xylene and hexane proved to be a far more active swelling agent for this particular polymer, and made possible the precipitation of a redispersible coagulum. The absorption capacity of the polymer for the xylene-hexane mixture was found to be 31%. The dispersion of Example XVI was centrifuged and the polymer particles were separated from the organic liquid fraction. When the liquid fraction was evaporated, less than 2% of the total solids present in the dispersion was found to have been removed in this fraction. This test gave definite evidence that a true dispersion of polymer particles had been made.

The above example illustrates the use of a technique which we have found to be very useful in preparing dispersions of polymers which have low absorption capacities for hexane and similar organic liquids. In this example, an organic liquid which is a far more active swelling agent for the polymer was added to the hexane, and the mixture of the two liquids then functioned as a single liquid having sufficient swelling effect on the polymer so that a redispersible coagulum could be precipitated.

EXAMPLE XVII

A 52% solids latex of a butadiene-styrene-acrylonitrile polymer having a Mooney viscosity of 92 at 212° F. and an absorption capacity of 22.5 was mixed with a 38.6% solids latex of "1014" butadiene-styrene rubber in the proportion of 192 grams of the polymer latex to 104 grams of the rubber latex. The mixture was pretreated with 140 grams of hexane and coagulation was effected by adding 300 grams of alcohol. A redispersible coagulum was precipitated. The resulting dispersion was classed as "borderline," indicating that the amount of more swellable polymer added was roughly the minimum amount which would be effective in this particular system.

The polymers were present in the latex mixture and in the coagulum in the proportion of 100 parts by weight of butadiene-styrene-acrylonitrile polymer solids to 40 parts of "1014" rubber solids. The hexane absorption capacity of the mixture was 50.

EXAMPLE XVIII

The butadiene-styrene-acrylonitrile polymer latex of Example XVII was mixed with the "1014" rubber latex in the proportion of 192 grams of the polymer latex to 52 grams of the rubber latex. 120 grams of a solvent mixture consisting of about 50% hexane and 50% toluene was added to the latices and stirring continued for about 10 minutes. When the mixture was coagulated by the addition of 250 grams of alcohol, a soft solid, redispersible coagulum was precipitated. The coagulum was dispersed by stirring in enough octane to give a stable, low viscosity dispersion.

The hexane-toluene mixture of Example XVIII is a more active swelling agent for the polymer-rubber mixture than is hexane alone. By using the solvent mixture in the pretreatment step, it was possible to reduce the amount of more swellable polymer from 40 parts (as in Example XVII) to 20 parts by weight for every 100 parts of butadiene-styrene-acrylonitrile polymer solids.

EXAMPLE XIX

The process of Example XVII was carried out substituting methyl chloroform as the swelling solvent in the pretreatment step. A soft solid, redispersible coagulum was precipitated, and an excellent dispersion was obtained by stirring hexane into the coagulum. It was apparent from the high quality of the dispersion obtained in this example as compared with that of Example XVII that the methyl chloroform was a more active swelling agent than hexane for the butadiene-styrene-acrylonitrile polymer—"1014" rubber mixture.

EXAMPLE XX

The process of Example XVIII was followed except that the solvent mixture consisted of about 50% hexane and 50% xylene. The quality of the dispersion was considerably better than that of Example XVIII, indicating that the xylene-hexane mixture was a more active swelling agent for the polymer-rubber combination than was the toluene-hexane mixture.

EXAMPLE XXI 200 grams of a 50% solids latex of polychloroprene (Neoprene 750) was mixed with 320 grams of a 25% solids latex of "X274" butadiene-styrene rubber. The latex mixture was treated with an organic liquid consisting of 200 grams of hexane and 100 grams of methyl ethyl ketone, after which the latex was coagulated by the addition of 360 grams of isopropyl alcohol. The soft solid coagulum, containing the hexane and methyl ethyl ketone absorbed within the rubber, was separated from the aqueous phase by centrifuging. A stable dispersion of mixed rubbers was obtained by stirring hexane into the coagulum.

EXAMPLE XXII 250 grams of a 40% solids latex of a medium acrylonitrile butadiene-acrylonitrile copolymer ("Hycar" 1562)

was mixed with 260 grams of a 38.6% solids latex of "1014" butadiene-styrene rubber. A solution consisting of 80 grams of ester gum and 20 grams of polymerized terpene dissolved in 200 grams of hexane was added to the latex mixture. After thorough stirring, 300 grams of alcohol was added.

The soft solid coagulum, containing the polymer mixture, the resins and the hexane, was separated from the aqueous-alcohol phase by centrifuging, after which the coagulum was dispersed by the addition of 250 grams of octane. A stable, fine particle size, low viscosity dispersion resulted.

EXAMPLE XXIII

A high acrylonitrile butadiene-acrylonitrile copolymer ("Hycar" 1551) was found to have an absorption capacity of 4.5. 200 grams of a 50% solids latex of this copolymer was mixed with 230 grams of a 38.6% solids latex of "1014" butadiene-styrene rubber. The latex mixture was pretreated by the addition thereto of a mixture of 100 grams of hexane and 100 grams of toluene, and was subsequently coagulated by the addition of 300 grams of alcohol. A soft solid coagulum was precipitated. The water-alcohol phase was separated from the coagulum by decantation, and the coagulum was redispersed by strring in 85 grams of hexane. An excellent dispersion of polymer particles in hexane resulted. The total solids of the dispersion was 31.6% and the viscosity was 7360 cps. at 70° F.

It is interesting to note that the latex mixture of Example XXIII, when pretreated with hexane alone, also yielded a redispersible coagulum. The dispersion which could be made from this coagulum, however, could only be classified as "borderline," indicating minimum pretreatment of the polymer particles. The quality of the dispersion was greatly improved by the use of the more active solvent mixture in the pretreatment step.

EXAMPLE XXIV

The latices used in Example XXIII were mixed in the proportion of 120 grams of acrylonitrile copolymer latex to 100 grams of "1014" rubber latex. The latex mixture was treated with 50 grams of hexane containing 0.3 grams of magnesium triisopropyl naphthalene sulfonate. Coagulation was effected by adding 50 grams of alcohol and the coagulum was separated from the aqueous phase by centrifuging. A good quality dispersion was obtained by stirring 100 grams of pentane into the coagulum.

The above example illustrates the improvement in dispersion quality which is sometimes obtained by the addition of a small quantity of a suitable surface active agent to the system. The surface active agent aids emulsification of the organic liquid in the latex, and apparently facilitates contact between the organic liquid and the polymer particles, making it possible to achieve the proper amount of preswelling with a relatively small amount of organic liquid. Suitable surface active agents must be at least partially soluble in both water and the organic liquid use.

Another high acrylonitrile butadiene-acrylonitrile copolymer ("Hycar" 1577) has been found to be particularly difficult to disperse. The absorption capacity of this polymer is 1.6. We have found it impossible to precipitate even a "borderline" redispersible coagulum from this particular polymer unless a combination of the above pretreatment methods was used. Borderline dispersions could be made by using a combination of more swellable polymer with a resin solution or with a more active solvent, but we have obtained best results with this polymer by combining all three methods, as shown in Example XXV.

EXAMPLE XXV 217 grams of a 46% solids latex of "Hycar 1577" was mixed with 260 grams of a 38.6% solids latex of "1014" butadiene-styrene rubber. 225 grams of a 33⅓% solution of ester gum in hexane was mixed with 50 grams of toluene, and the mixture was stirred into the latex mixture. Coagulation was effected by the addition of 360 grams of alcohol.

The soft solid coagulum was separated from the aqueous-alcohol phase by centrifuging and was redispersed by stirring in 215 grams of hexane. A stable, low viscosity dispersion resulted.

EXAMPLE XXVI 400 grams of a 25% solids latex of "X274" butadiene-styrene rubber was pretreated with 40 grams of hexane and coagulated by the addition of 100 grams of alcohol and 7.5 grams of a 20% solution of zinc ammonium benzoate. The solid, non-tacky coagulum was separated from the aqueous phase by centrifuging, and was redispersed by stirring in 100 grams of diisobutyl ketone.

The above example shows how a rubber which is soluble in hexane may be precipitated in the form of a swollen solid, redispersible coagulum by the pretreatment of the latex with a small quantity of hexane. The amount of hexane used was sufficient only to cause swelling of the rubber, rather than solution. The resultant coagulum was a solid non-tacky mass. The rubber particles could be redispersed in a non-solvent liquid such as diisobutyl ketone, or if desired a solution of the rubber could be made by stirring hexane into the coagulum. This provides a method for making a solution of a rubber which is somewhat simpler and quicker and requires less outlay in machinery and power than the usual method of manufacturing rubber solutions.

EXAMPLE XXVII 400 grams of a 25% solids latex of "X274" butadiene-styrene rubber was pretreated with a mixture of 20 grams of hexane and 100 grams of alcohol. Coagulation was effected by adding 7.5 grams of a 20% solution of alum. A solid, non-tacky coagulum was precipitated and separated from the aqueous phase by decantation. The coagulum was found to contain, in addition to the hexane, a considerable amount of alcohol absorbed within the rubber. This coagulum, like the one described in the preceding example, could be redispersed in a non-solvent organic liquid or could be dissolved in a solvent liquid such as hexane.

The alcohol added with the hexane in the foregoing example acted in a dual capacity. In the first place, it acted as a diluent for the hexane, cutting down the solvating effect of the hexane on the rubber; secondly, it served as a part of the total coagulant used.

EXAMPLE XXVIII 110 grams of a 46% latex of polymerized ethyl acrylate ("Darex" 701) was added to 100 grams of a 40% solids latex of "1014" butadiene-styrene rubber. A solution of 50 grams of a rosin ester gum ("Synthe-Copol–1200") in 90 grams of hexane was added to the latex mixture with stirring, after which coagulation was effected by the addition of 100 grams of ethyl alcohol to which had been added 25 grams of a 20% solution of zinc ammonium benzoate. The coagulum was separated from the water and was redispersed by stirring in 120 grams of hexane. A stable, fine particle size dispersion of the mixture of ethyl acrylate and "1014" rubber resulted.

EXAMPLE XXIX 100 grams of a 53.2% solids vinyl chloride latex ("Geon—450 x 3") was pretreated by stirring in 70 grams of an organic liquid mixture consisting of 12% of diisobutyl ketone, 20% of xylene and 68% of hexane and 2 grams of magnesium triisopropyl naphthalene sulfonate. The latex mixture was coagulated by the addition of 20 grams of alcohol to which had been added 5 grams of a 20% solution of zinc ammonium benzoate. A soft swollen coagulum was precipitated, the water was squeezed out, and the coagulum was redispersed by stirring in 83.5 grams of the organic liquid mixture used for the preswelling step to which 1 gram of "Modicol N" a fatty amido condensate type of non-ionic surface active agent was added. The total solids of the resulting dispersion was 30.6% and the viscosity was 2500 cps. at 70° F. The absorption capacity of the vinyl chloride for the organic liquid mixture was 81.6%, whereas the absorption capacity of the vinyl chloride for hexane alone was 21.4%.

EXAMPLE XXX

A vinylidene chloride (90%)-acrylonitrile (3%)-butyl acrylate (7%) terpolymer was dispersed in an organic liquid by the following procedure. 100 grams of a 39% solids latex of the terpolymer was mixed with 33.3 grams of a 40% solids latex of "1014" butadiene-styrene rubber, 1 gram of "Modicol N" and 26.6 grams of an organic liquid mixture consisting of 10% of diisobutyl ketone, 10% of xylene, 15% of tetrahydrofuran and 65% of hexane was stirred in. The latex mixture was coagulated by the addition of 67 grams of alcohol and the water-phase was squeezed out of the swollen, doughy solid coagulum. The coagulum was redispersed by stirring in 1.3 grams of "Modicol N" and 110 grams of the same organic liquid mixture used in the preswelling step. After this 78 grams of an organic liquid mixture consisting of 58% hexane, 14% diisobutyl ketone and 28% tetrahydrofuran was added. The total solids of the resulting dispersion was 25% and the viscosity was 3,000 centipoises at 70° F. The absorption capacity of the terpolymer for the organic liquid mixture was 6.9%, whereas by contrast its absorption capacity for hexane was 0%.

It is apparent from the above examples that the essence of our invention is the precipitation of a redispersible coagulum and that controlled preswelling of the polymer particles in the latex state by absorption of an organic liquid is necessary to the formation of the redispersible coagulum. The amount of swelling of the polymer particles is determined by the capacity of the polymer to absorb the organic liquid which is added to the water dispersion of the polymer particles.

The behavior of the coagulum is the ultimate test as to whether the pretreatment used has produced the correct amount of preswelling of the polymer particles. If the particles have not been swollen sufficiently, the coagulum will be too hard and cannot be redispersed by stirring in a non-solvent organic liquid. Too much preswelling, on the other hand, will cause formation of a coagulum from which the water phase of the latex cannot be separated.

It is also apparent from the examples that the absorption capacity of a polymer for an organic liquid may be increased by a variety of different methods or combinations of the different methods. Generally speaking, the lower the intrinsic absorption capacity of the polymer, the more stringent must be the methods used for increasing its absorption capacity in order to make possible the precipitation of a redispersible coagulum. However, differences between polymers, apparently due to chemical structure or other inherent characteristics of the polymers, make it impossible to predict the behavior of a given polymer exactly. The proper method of treatment for any polymer may be determined by following the general teaching set forth above and by observing the nature of the coagulum obtained.

The most effective method we have found for increasing absorption capacity of a polymer is the addition of a second polymer which has a considerably higher absorption capacity than the first. The two polymers are mixed together in the form of latices, and a redispersible coagulum may be precipitated from the mixture, the polymer combination which is precipitated having a higher absorption capacity than the original polymer. It is in this sense that we use the expression "increasing the absorption capacity of a polymer by the method of adding a second polymer having a higher absorption capacity." This method alone has been successful with the majority of polymers which we have tested. In only a few cases, notably with the high acrylonitrile "Hycar" rubbers, did we find it impossible to obtain redispersible coagula by following this method alone. Other methods of increasing absorption capacity may be used where addition of a second polymer is undesirable or where it is desired to obtain special properties in the finished dispersion. In addition, we have often found it advantageous to use combinations of two or more of the methods, as shown in a number of the preceding examples.

As pointed out above, the pretreatment of the polymer in aqueous dispersion must be carefully controlled in order to obtain the desired degree of swelling of the polymer particles in the latex and, as a consequence, the desired properties in the coagulum. We have found, as a result of our many experiments with different polymers and varying pretreatments, that the amount of organic liquid added to the latex must also be regulated if a redispersible coagulum is to be precipitated. If too much organic liquid is added, the coagulum is difficult to separate from the water phase and is too soft to handle in conventional equipment. Apparently, dispersion of the polymer particles in organic liquid begins to take place before the coagulum is separated from the water, with the result that a semi-liquid mass is formed, in which the water may be held in emulsion form. On the other hand, if too small an amount of organic liquid is added, the cohesive forces are not reduced sufficiently and the coagulum cannot be redispersed. Due to the variations between polymers and the different swelling effect of various organic liquids, no exact amounts or ranges of amounts of organic liquids necessary for the pretreatment step can be set forth. In general, we have found as a result of our experimentation that organic liquids which have a strong swelling effect on a given polymer, in other words liquids for which the polymer has a high absorption capacity, must be added in rather small quantities. Organic liquids for which the polymer has a relatively low absorption capacity may be added in larger quantities. As a rough generalization, it may be said that the quantity of organic liquid which must be added to the polymer latex in order to precipitate a redispersible coagulum is inversely proportional to the absorption capacity of the polymer for the organic non-solvent liquid. As disclosed above, even liquids which are solvents for the polymers may be used in the pretreatment step, provided that they are added to the latex in such small amounts that their effect on the polymer is limited to swelling, and that the coagulum which is precipitated is a solid coagulum. The exact amount of any organic liquid which must be added to a polymer latex in order to precipitate a redispersible coagulum may be determined by following the above disclosure and by observing the nature of the coagulum formed. As stated above, the addition of too much organic liquid prevents the separation of water from the coagulum, while the addition of too small an amount of organic liquid results in the precipitation of a coagulum which is too tough and cannot be redispersed. Between these two extremes, the correct amount of organic liquid which must be added may be determined by experimentation.

The amount and nature of the coagulant which is added to the pretreated latex must also be regulated to some extent. In general, it may be said that alcohols, ketones and similar dehydrating coagulants may be added in any amounts which will bring about precipitation of a coagulum. Excess quantities of these coagulants will have no adverse effect on the properties of the coagulum or of the finished dispersion. The stronger coagulants, i.e. electrolytes such as alum, calcium nitrate and zinc ammonium benzoate, however, have a tendency to precipitate harder, tougher coagula. These coagulants, therefore, should be added in small, carefully controlled amounts, or the polymer particles in the latex should be swollen to a greater degree than usual before the latex is coagulated. The amount of coagulant must sometimes be adjusted because of variations in the latex itself. The amount of soap or other stabilizer, for example, which is present in the latex will determine to some degree the amount of coagulant which must be used. It will be possible to determine the exact amount of a given coagulant which should be added by following the teachings of the above examples and by observing the characteristics of the coagulum obtained.

We have found, furthermore, that the nature of the coagulant used to some extent determines the properties of the finished dispersion. For example, when alcohol is used as a coagulant, a large part of the soap stabilizer present in the original latex is extracted in the aqueous phase, leaving the coagulum relatively free of water soluble materials. On the other hand, it may be desirable to convert the soap to an insoluble form by the addition of a calcium or magnesium salt, and to leave the converted soap in the coagulum in order to enhance its end-use properties. In such cases, a suitably electrolytic coagulant may be used.

As disclosed above, these are some cases in which the pretreating liquid and the coagulant may be added simultaneously to the latex. This is possible where the absorption of organic liquid by the latex particles is extremely rapid and is able to take place before coagulation can be accomplished.

It has been our experience that the redispersible coagula of our invention cannot be produced unless a certain minimum amount of preswelling of the latex particles has taken place. Measuring this minimum amount of preswelling in terms of absorption capacity, we have found that a polymer or polymer combination must have an absorption capacity of at least about 25, in other words must be able to absorb an organic liquid in an amount equivalent to at least about 25% of its own weight, in order for pretreatment with the organic liquid to make possible the precipitation of a redispersible coagulum.

We have found that certain polymers with which we have worked require an even higher degree of preswelling, in other words higher absorption capacities, in order to overcome the cohesive forces within the coagulum, as will be seen by reference to Table I. We have also determined absorption capacities for certain of the polymer-polymer and polymer-resin combinations shown in the examples, and have related these absorption capacities to redispersibility of the corresponding coagula, as shown in Table III. The polymer combinations shown in the Table III were tested for absorption of hexane according to the process described above, with the exception of the polymer-ester gum combination. This mixture was tested by the method described under Example XIII. Absorption capacity in each instance indicates the amount of hexane absorbed by the polymer combination.

*Table III*

| Polymer combinations | Absorption capacity (in percent organic liquid on weight of polymer) | Redispersibility of coagulum |
|---|---|---|
| (1) Butadiene-styrene-acrylonitrile polymer (Mooney viscosity 92), 71%—"1014" butadiene-styrene rubber, 29%. | 50 | Borderline. |
| (2) Polychloroprene (Neoprene 950), 85%—"1014" butadiene-styrene rubber, 15%. | 36 | Do. |
| (3) Butadiene-styrene-acrylonitrile polymer (Mooney viscosity 92), 50%—ester gum, 50%. | 35 | Good. |
| (4) Polychloroprene (Neoprene 571), 85%—"1014" butadiene-styrene rubber, 15%. | 25 | Borderline. |

It is clear from Table III that the absorption capacities of polymer combinations also vary widely and that different degrees of preswelling (measured by absorption capacity) are necessary in order to precipitate redispersible coagula from these polymer combinations.

In all our work, however, we have found definite indications that some swelling of the polymer particles in the latex state is a necessary prerequisite to the precipitation of a redispersible coagulum, and that the minimum amount of preswelling allowable is that which is caused by absorption of organic liquid in an amount of at least about 25% of the weight of the polymer. Stated in another way, we have found that the absorption capacity of a given polymer or polymer combination for a given organic liquid must be at least about 25 in order for pretreatment with the given organic liquid to make possible precipitation of a redispersible coagulum from an aqueous dispersion of the polymer or polymer combination.

Fillers, pigments and other compounding materials may be added to the dispersions produced according to our invention, preferably in the form of suspensions in the organic liquid used as the dispersing medium for the polymer particles. A more advantageous method of adding certain compounding materials is to add them to the latex itself. This method has the advantage that the finely dispersed compounding material comes into contact with the latex particles before agglomeration takes place, with the result that an extremely intimate admixture of compounding material and polymer is formed. The filler or other compounding material so added has far greater effectiveness than it would if it were added to the finished dispersion of the polymer in organic liquid. The addition of compounding ingredients to the latex is illustrated by the following example.

EXAMPLE XXXI 36 grams of a wet-ground Georgia clay ("Buca" clay) was mixed with 20 grams of hexane and 40 grams of a 50% solution of ester gum in hexane, and the mixture was stirred until the clay was thoroughly dispersed. 100 grams of a 35% solids latex of a butadiene-styrene-acrylonitrile polymer having a Mooney viscosity of 192 at 212° F. and an absorption capacity of 17.5 was then added and the whole mixture was stirred together for about 10 minutes. Coagulation was effected by the addition of 100 grams of alcohol, after which the water was removed from the soft solid coagulum by decantation. A dispersion was made by stirring additional hexane into the coagulum, the quantity of hexane being regulated by the viscosity and total solids desired in the finished dispersion.

In the above example, the Buca clay was added to the latex in the form of a suspension in the organic liquid with which the latex was pretreated. This method of operation had the further advantage that the hydrophilic Buca clay, by its thorough admixture with organic liquid before being added to the latex, was rendered hydrophobic. The mixed coagulum containing the butadiene-styrene-acrylonitrile polymer and the clay separated cleanly and easily from the water phase of the latex and carried with it no more absorbed water than if the clay had not been present. By contrast, untreated hydrophilic clays, when stirred into latex, or when added to the latex in the form of a water suspension, absorb a considerable amount of water, which is carried down into the coagulum and is very hard to separate therefrom. Furthermore, dried films deposited from dispersions made according to Example XXXI are not susceptible to water, whereas films containing a hydrophilic clay which has been added to latex in the usual manner are distinctly water-susceptible.

Surface active agents, as for example the magnesium triisopropyl naphthalene sulfonate shown in Example XXII, the condensate of ethylene oxide with propylene oxide and propylene glycol sold under the trademark of "Pluronic L61", sorbitan di-oleate, and ammonium laurate-rosinate may also be added to the latex at the same time as the organic liquid with which the latex is pretreated. The surface active agents apparently have a dual advantage when added in this fashion, acting at the same time to promote more intimate contact between the organic liquid and the polymer particles and to ensure good dispersion in the organic liquid of any other compounding materials which may be added at the same time. The latter function is particularly important with certain fillers such as clays, certain calcium silicates, and iron oxides, which have a tendency to absorb large quantities of the organic liquid, thereby making it unavailable for its primary purpose of swelling the polymer particles.

We claim:

1. A process for producing a coagulum of polymer particles having reduced particle to particle cohesiveness, comprising the steps of: (1) said polymer being selected from the group consisting of a vinyl polymer and mixtures thereof, said water dispersion being characterized by its ability to produce a coherent film when dried under film forming conditions and to produce a cohesive coagulum when coagulated in bulk with conventional coagulating agents without modification; (2) swelling the polymer particles in said water dispersion with a volatile organic normally liquid swelling agent which is absorbed in an amount of at least 25% by weight of the polymer particles as determined by the Film Absorption Capacity Test by admixing said swelling agent with said water dispersion while maintaining the discrete nature of said particles and their dispersed state in the water; (3) coagulating the particles so swollen; and (4) recovering a soft solid coherent coagulum containing absorbed swelling agent, said coagulum being characterized by its ability to be readily dispersed in a volatile organic normally liquid non-solvent dispersing medium and form a stable dispersion of microscopic particles therein.

2. The process of claim 1 wherein the swelling of said particles is controlled responsive to the dispersibility of said coagulum in said organic dispersing medium, the amount of swelling being increased as the dispersibility decreases as determined by the Film Absorption Capacity Test.

3. The process of claim 1 wherein substantially all of said swelling agent appears with said coagulum and substantially none of said swelling agent remains with the water phase.

4. The process of claim 1 wherein the steps of swelling and of precipitating the polymer particles are carried out simultaneously.

5. The process of claim 1 wherein said water dispersion contains a mixture of particles of polymers of different relative degrees of compatibility with said swelling agent.

6. The process of claim 1 wherein said water dispersion is heated to 120° F. during said swelling.

7. The process of claim 1 wherein an ester gum resin which is compatible with said particles and soluble in said swelling agent is present in said water dispersion during said swelling.

8. The process of claim 7 wherein said resin is added to said water dispersion in the form of a solution of resin in the swelling agent.

9. The process of claim 1 wherein said swelling agent comprises a mixture of volatile organic normally liquid swelling agents of different relative degrees of compatibility with said particles.

10. The process of claim 1 wherein said polymer is a butadiene-styrene-acrylonitrile interpolymer, wherein said swelling agent is an ester gum-hexane solution, and said dispersing agent is hexane.

11. The process of claim 1 wherein a volatile organic liquid non-solvent dispersing medium is added to said coagulum, and the coagulum and dispersing medium are agitated to form a stable dispersion.

12. The process of claim 1 wherein said polymer absorbs between 60 percent and 115 percent, based on the weight of the polymer, of the swelling agent as determined by the Film Absorption Capacity Test and wherein said swelling agent is added to the said water dispersion in an amount of at least 50 percent of the weight of said particles and below that amount which causes phase reversal of said water dispersion.

13. The process of claim 1 wherein said polymer absorbs between 25 percent and 60 percent, based on the weight of the polymer, of the swelling agents as determined by the Film Absorption Capacity Test and wherein said swelling agent is added to said water dispersion in an amount of at least 100 percent of the weight of said particles, and below that amount which causes phase reversal of the said water dispersion.

14. The process of claim 1 wherein said polymer is a butadiene-styrene-acrylonitrile interpolymer.

15. A soft solid redispersible coagulum derived from a polymer selected from the group consisting of a vinyl polymer and mixtures thereof and characterized by its ability to form a water dispersion which will yield a coherent film when dried under film forming conditions and a cohesive coagulum when coagulated with conventional coagulating agents without modification, said coagulum comprising a mass of discrete particles of said polymer which contain absorbed therein and are swollen by a volatile organic normally liquid swelling agent for the polymer in an amount of at least 25% of the weight of the polymer as determined by the Film Absorption Capacity Test, said coagulum being characterized by its ability to be readily redispersed in a volatile organic liquid non-solvent dispersing medium and form a stable dispersion of microscopic particles therein.

16. A stable dispersion of a polymer in a volatile organic liquid non-solvent dispersing medium, said polymer being selected from the group consisting of a vinyl polymer and mixtures thereof, substantially all the polymer being present therein in the form of discrete dispersed particles, said polymer originally being characterized by its ability to form a water dispersion which will yield a coherent film when dried under film forming conditions and a tough, cohesive coagulum when coagulated with conventional coagulating agents without modification, the polymer particles in said dispersion being between about 0.2 and 30 microns in diameter and containing absorbed therein at least 25% by weight of the polymer of a volatile organic, normally liquid, swelling agent for the polymer as determined by the Film Absorption Capacity Test, and said stable dispersion containing not more than about five percent water.

17. The dispersion of claim 16 wherein said polymer is a hexaneinsoluble 50–50 butadiene-styrene polymer and the swelling agent is hexane.

18. The dispersion of claim 16 wherein said polymer consists of a mixture of polychloroprene and a 50–50 butadiene-styrene copolymer.

19. The dispersion of claim 16 wherein said polymer consists of a mixture of a high styrene butadiene-styrene copolymer and a 50–50 butadiene-styrene copolymer.

20. The dispersion of claim 16 wherein said polymer consists of a mixture of a high acrylonitrile butadiene-acrylonitrile copolymer and a 50–50 butadiene-styrene copolymer.

21. The dispersion of claim 16 wherein the polymer is polymerized ethyl acrylate.

22. The dispersion of claim 16 wherein said polymer is polyvinyl chloride.

23. The dispersion of claim 16 wherein said polymer is a terpolymer of 90% vinylidene chloride, 3% acrylonitrile and 7% butyl acrylate.

24. The dispersion of claim 16 wherein said polymer is a butadiene-styrene-acrylonitrile interpolymer.

(References on following page)

References Cited by the Examiner
UNITED STATES PATENTS

| | | | |
|---|---|---|---|
| 2,296,427 | 9/1942 | Daniel et al. | 260—34.2 |
| 2,313,144 | 3/1943 | Gomm | 260—34.2 |
| 2,373,347 | 4/1945 | Schoenfeld | 260—34.2 |
| 2,448,952 | 9/1948 | Berry | 260—34.2 |
| 2,556,260 | 6/1951 | Downing | 260—34.2 |
| 2,567,719 | 9/1951 | Loritsch | 260—34.2 |
| 2,647,101 | 7/1953 | Humphrey et al. | 260—33.6 |
| 2,739,954 | 3/1956 | Fryling | 260—34.2 |
| 2,791,571 | 5/1957 | Wheelock et al. | 260—29.7 |
| 2,963,388 | 12/1960 | Landouar | 260—33.6 |

WILLIAM H. SHORT, *Primary Examiner*.

DONALD ARNOLD, MILTON STERMAN, LEON, J. BERCOVITZ, *Examiners*.

UNITED STATES PATENT OFFICE
CERTIFICATE OF CORRECTION

Patent No. 3,218,278            November 16, 1965

Arthur J. Leydon et al.

It is hereby certified that error appears in the above numbered patent requiring correction and that the said Letters Patent should read as corrected below.

Column 17, line 17, after "(1)" insert -- providing a latex composed of polymer particles dispersed in water, --.

Signed and sealed this 19th day of July 1966.

(SEAL)
Attest:

ERNEST W. SWIDER
Attesting Officer

EDWARD J. BRENNER
Commissioner of Patents